United States Patent [19]

Wells et al.

[11] Patent Number: 5,263,643

[45] Date of Patent: Nov. 23, 1993

[54] THERMALLY RESPONSIVE RELIEF VALVE

[75] Inventors: Gordon K. Wells; Ronald L. Holden, both of Mansfield, Ohio

[73] Assignee: Therm-O-Disc, Incorporated, Mansfield, Ohio

[21] Appl. No.: 996,627

[22] Filed: Dec. 24, 1992

[51] Int. Cl.⁵ ............................................. G05D 23/10
[52] U.S. Cl. ................................. 236/48 R; 236/92 C
[58] Field of Search ....................... 236/48 R, 92 C; 137/859; 251/75

[56] References Cited

U.S. PATENT DOCUMENTS

| | | | |
|---|---|---|---|
| 1,972,169 | 9/1934 | Spencer | 236/92 C |
| 1,972,170 | 9/1934 | Spencer | 236/92 C |
| 3,047,235 | 7/1962 | Eshbaugh et al. | 236/92 C |
| 3,930,613 | 1/1976 | Place | 236/48 R |
| 4,029,257 | 6/1977 | Jenkins et al. | 236/48 R |
| 4,068,800 | 1/1978 | Doherty, Jr. | 236/48 R X |
| 4,295,602 | 10/1981 | Priesmeyer | 236/48 R X |
| 4,596,653 | 5/1986 | Foller et al. | 236/48 R |
| 4,821,954 | 4/1989 | Bowder | 236/48 R |
| 4,830,277 | 5/1989 | Hood | 236/48 R X |

Primary Examiner—William E. Tapolcai
Attorney, Agent, or Firm—Jones, Day, Reavis & Pogue

[57] ABSTRACT

A thermally responsive pressure relief valve using a bimetallic valve disc as a component. The bimetallic valve disc is used as a temperature sensitive valve seal. When temperatures go beyond the set point of the disc, it opens the valve with a snap acting motion permitting pressure to be vented through the valve. The valve disc automatically resets and reseals the valve when temperatures return to the reset point of the disc.

9 Claims, 2 Drawing Sheets

THERMALLY RESPONSIVE RELIEF VALVE

FIELD OF THE INVENTION

This application relates to the art of pressure relief valves in general and in particular to a relief valve that is applicable for use with compressors where the pressure in a chamber can be automatically relieved at a predetermined temperature. While the invention is particularly applicable for use with air conditioner compressors, it will be appreciated that the invention has broader aspects and can be used for regulating and relieving pressure in other devices.

BACKGROUND OF THE INVENTION

Air conditioner compressors are commonly provided with a pressure cutoff switch for turning the compressor off when a predetermined pressure is reached. In other embodiments, a thermostat is placed in the plenum chamber to sense temperature and, at a predetermined temperature, it directly shuts off the compressor motor. Both the pressure cutoff and the thermostat cutoff cycles the compressor "off" during high pressure and high temperature conditions and back to the "on" position when the pressure or temperature is again at normal level.

In the event of a malfunction, such as an electrical failure or externally applied heat, either the thermal cutoff or the pressure cutoff may not turn the compressor off. The pressure will then continue to build and could result in an explosion. To prevent such an explosion, it is common to provide a pressure relief valve for venting the pressure when it exceeds a predetermined value.

In commonly assigned U.S. Pat. No. 4,948,931, a pressure relief valve is disclosed in which a snap disc, capable of assuming opposite bowed positions, will snap to a reverse bowed configuration and cause a diaphragm to be ruptured by a pin. The pressure will then be vented through the interior of the housing to the vent opening. In such case, when the problem is corrected, the pressure relief valve has to be replaced.

In a first embodiment, the present invention overcomes the disadvantages of the prior art by providing a simple snap disc that is snappable between opposite bowed positions. In one position, the snap disc seals a vent orifice in a chamber such that when the temperature in the chamber reaches a predetermined amount, the snap disc is snapped to the opposite bowed position to uncover the vent orifice and vent the pressure in the chamber. When the temperature returns to normal, the snap disc is snapped back to the initial bowed position thus again sealing the chamber and allowing pressure to exist. The vent orifice has a valve seat and the snap disc has a matching shape with a surface substantially in the center thereof for matching the arcuate valve seat to completely seal the orifice in the first bowed position. While there are different types of matching valve seats and snap discs, for ease of explanation and representation in the drawings, an arcuate shape will be used and shown. However, it should be noted that the term "arcuate" is intended to cover any matching seals including simple square shoulders sealed around and over the orifice of the valve seat. In this embodiment, there is at least one orifice in the snap disc in the area surrounding the arcuate convex sealing surface to allow pressure in the enclosed chamber to be vented through the vent orifice when the snap disc is in the opposite bowed position.

In a second embodiment, the arcuate convex sealing surface is an insert in the snap disc for sealing the orifice and the insert may be a rivet-like structure whose head seals the vent orifice or a polymeric structure with a convex head that seals the vent orifice.

In yet another embodiment, the vent orifice includes a polymeric valve seat in the shape of a truncated cone and the snap disc is saucer shaped with a flat surface matching the truncated cone surface to completely seal the vent orifice in the first bowed position of the snap disc.

In still another embodiment, at least one recess is formed in the periphery of the snap disc to allow pressure in the enclosed chamber to be vented through the recess and the vent orifice when the snap disc is in the opposite bowed position.

Also, in still another embodiment, an opening is formed in the chamber under the periphery of the snap disc in at least one area to allow pressure in the enclosed chamber to be vented through the opening and the vent orifice when the snap disc is in the opposite bowed position.

In the embodiments just discussed, the snap disc is installed in a valve having a spatial orientation such that gravity causes the snap disc to settle under its own weight onto the vent orifice so that the orifice can be sealed. To ensure a positive seal or to use the snap disc in a device in which the spatial orientation of the snap disc is such that it cannot be pulled by gravity onto the vent orifice, a biasing mechanism is associated with the snap disc to forcibly orient it in sealing relationship with the vent orifice in the first bowed position. In one of these embodiments, the biasing mechanism is a resilient foam washer mounted between the chamber and the snap disc such that when the snap disc reverts to the first bowed position from the second bowed position, the resilient foam washer forces the snap disc into sealing relationship with the vent orifice.

In another embodiment, the biasing mechanism is a coil spring mounted between the chamber and the snap disc such that when the snap disc reverts to the first bowed position from the second bowed position, the coil spring forces the snap disc into sealing relationship with the orifice.

Where the vent orifice has a concave surface and the snap disc has a mating concave surface such that the mating surfaces seal the orifice in the first bowed position, the biasing mechanism can be a spring with an axial extension mounted between the chamber and the snap disc with the axial extension engaging the concave surface of the disc such that when the snap disc reverts to the first bowed position from the second bowed position, the spring with axial extension forces the snap disc into sealing relationship with the orifice.

Thus, it is an object of the present invention to provide a thermally responsive pressure relief valve for mounting in an enclosed chamber and which has a vent orifice and a snap disc being snappable between opposite bowed positions with the snap disc sealing the vent orifice in a first bowed position such that when the temperature in the chamber reaches a predetermined amount, the snap disc is snapped to the opposite bowed position to uncover the orifice and vent the pressure in the chamber.

It is yet another object of the present invention to provide a pressure relief valve with a snap disc having a saucer shape with an arcuate convex surface substantially in the center thereof for matching an arcuate valve seat to completely seal the orifice in the first bowed position of the disc.

It is also an object of the present invention to provide orifices in a valve snap disc in an area surrounding an arcuate convex surface that seals the vent orifice to allow pressure in the enclosed chamber to be vented through the vent orifice when the snap disc is in the opposite bowed position.

It is still another object of the present invention to provide a relief valve with a snap disc having an arcuate convex surface formed in an insert of the snap disc for sealing a vent orifice.

It is also an object of the present invention to provide a vent orifice formed of a polymeric valve seat in the shape of a truncated cone with a snap disc being saucer shaped with a substantially flat surface matching the truncated cone surface to completely seal the vent orifice in the first bowed position of the snap disc.

It is yet another object of the present invention to provide a relief valve with at least one recess in the periphery of a snap disc to allow pressure in an enclosed chamber to be vented through a vent orifice when the snap disc is in the opposite bowed position.

It is also another object of the present invention to provide a relief valve with a vent orifice in a chamber being sealed by a snap disc in a first bowed position and including an opening in the chamber under the periphery of the snap disc to allow pressure in the enclosed chamber to be vented through the chamber opening and the vent orifice when the snap disc is in the opposite bowed position.

It is still another object of the present invention to provide a thermally responsive pressure relief valve wherein a snap disc is mounted in a chamber of the relief valve in a spatial relationship such that gravity orients the snap disc in sealing relationship with the vent orifice when the snap disc is in the first bowed position.

It is also another object of the present invention to provide a thermally responsive pressure relief valve in which a biasing mechanism is associated with a snap disc to forcibly orient snap disc in sealing relationship with a vent orifice when the snap disc is in the first bowed position regardless of the spatial orientation of the snap disc and the chamber. The biasing mechanism may be a resilient foam washer, a coil spring or a spring with an axial extension, any one of which would be mounted between the chamber and the snap disc such that when the snap disc reverts to the first bowed position from the second position, the biasing mechanism forces the snap disc into sealing relationship with the orifice.

SUMMARY OF THE INVENTION

Thus, the present invention relates to a thermally responsive pressure relief valve mounted in an enclosed chamber comprised of a vent orifice in the chamber, a thermally responsive disc being snappable between opposite bowed positions, the disc configured to seal the vent orifice against pressure, a support provided for the disc such that the disc seals the vent orifice when in a first bowed position, and when temperature in the chamber reaches a predetermined amount, the disc snaps to the opposite bowed position and opens the orifice, and clearances associated with the disc to permit gas in the enclosed chamber free passage to the orifice for venting the pressure in the chamber.

BRIEF DESCRIPTION OF THE DRAWINGS

These and other objects of the present invention will be more readily understood when taken in conjunction with the following detailed description and the drawings in which like numbers represent like elements and in which.

DETAILED DESCRIPTION OF THE DRAWINGS

Figure 1:
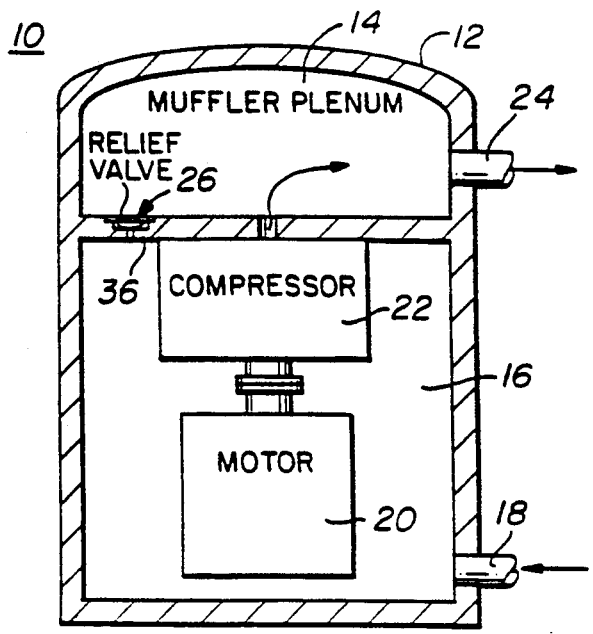
FIG. 1 is a diagrammatic representation of a compressor device having a pressure chamber in which the novel relief valve is installed.

FIG. 1 is a diagrammatic representation of a compressor chamber 10 including a housing 12 with an upper pressure chamber 14 and a lower compressor chamber 16. Inlet 18 allows air to be admitted to chamber 16 where it is compressed by a compressor 22 driven by a motor 20. The compressed air is fed into the upper chamber 14 where it can be coupled by outlet 24 to a work unit. A relief valve 26 is formed in the pressurized chamber 14. It is designed to relieve pressure in the chamber 14 when the temperature rises to a predetermined value. Thus it provides a safety feature for the compression device. The relief valve is designed such that it closes a vent orifice until such time as the temperature reaches the predetermined value. At that time the vent orifice is uncovered and the pressure is released.

Figure 2:
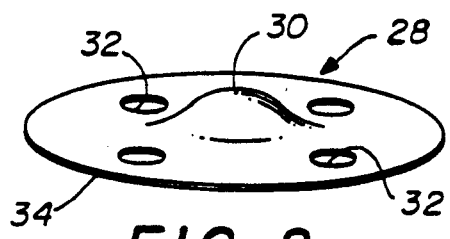
FIG. 2 is an isometric view of a snappable disc used in the pressure relief valve.

The present invention utilizes a bimetallic valve such as disc 28 in FIG. 2 as a component of a thermally responsive relief valve. The bimetallic valve disc 28 is a temperature sensitive valve seal. When temperatures go beyond the set point of the disc, the disc opens the relief valve 26 with a snap acting motion. It automatically resets and reseals the valve when the temperature returns to the reset point of the valve disc.

The bimetallic valve disc 28 is used in a compressor 10 in FIG. 1 to protect against overheating of refrigerant resulting in coking of the refrigerant oil which causes loss of lubrication, bearing wear and general failure. The bimetallic valve disc 28 is mounted in the muffler plenum chamber 14 where it is exposed to the compressed refrigerant at the hottest point in the gas cycle, i.e. as the gas is being discharged from the compressor 22. When the system overheats due to a blocked heat exchanger, loss of cooling fan, loss of refrigerant and the like, the valve disc 28 opens a bypass valve reducing the pressure differential across the compressor 22 and the load on the compressor motor 20 without actually cycling the motor off. Thus a flow of refrigerant continues to keep the system at a more uniform temperature and ready to respond as soon as the blockage or other problem is corrected. Such bimetallic snap action discs are well known in the art such as described in U.S. Pat. No. 3,660,793.

Figure 3:
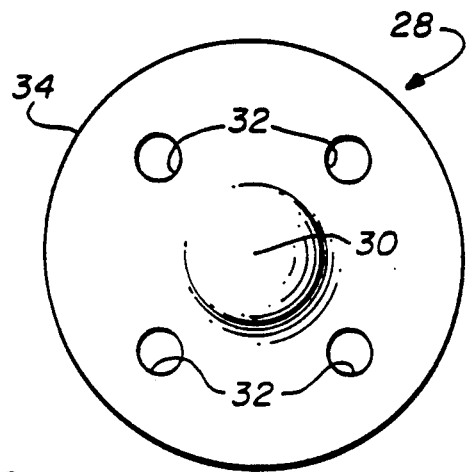
FIG. 3 is bottom view of the snappable disc illustrated in FIG. 2.
Figure 4:
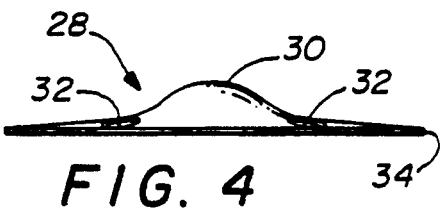
FIG. 4 is a side view of the snappable disc show in FIGS. 2 and 3.

FIG. 2 discloses the snap disc 28 that can be used to seal a vent orifice in the relief valve 26. The snap disc 28 is snappable between opposite bowed positions. It has a generally saucer shape as can be seen in the side view in FIG. 4 and has an arcuate convex center surface 30 which generally matches the contour of the valve seat of the vent orifice. It also has orifices 32 therein which allow air to pass through the disc 28 when the temperature causes it to snap to the other position and open the vent orifice. As stated, the snappable disc is of well known construction in the prior art and utilizes generally a bimetallic construction such that one material expands faster than the other to cause the disc 28 to move from a first bowed position to a second bowed position with a change in temperature. FIG. 3 is a bottom view of the snap disc 28 of FIG. 2. FIG. 4 is a side view of the snap disc illustrating the saucer shape with the arcuate convex surface 30 substantially in the center thereof for matching the arcuate valve seat to completely seal the orifice of the valve seat in the first bowed position. The snap disc 28, when pivoted as shown in FIGS. 5, 6, 8, 9 and 10, settles under the influence of gravity onto the orifice 40 to seal the orifice 40 when the snap disc is in its first bowed position.

Figure 5:
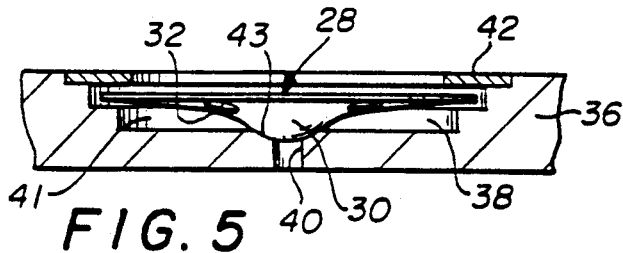
FIG. 5 is a diagrammatic representation of a novel thermally responsive pressure relief valve in an enclosed chamber in which there is a vent orifice and in which the snap disc is shown sealing the orifice.

FIG. 5 is a diagrammatic representation of the relief valve 26 illustrating the elements thereof. It is formed in the wall 36 which separates the pressurized plenum chamber 14 from the lower chamber 16 shown in FIG. 1. A vent orifice 40 is formed in the bottom of a recess 41 in the wall 36. The orifice 40 has an upper arcuate valve seat 43 which matches the contour of the convex surface 30 of the snappable disc 28. Thus in the first bowed position shown in FIG. 5, the arcuate convex surface 30 is seated in the arcuate valve seat 43 thus closing the vent orifice 40 and preventing any escape of pressure from chamber 14. Pressure in chamber 14 securely seals orifice 40 with disc 28.

Figure 6:
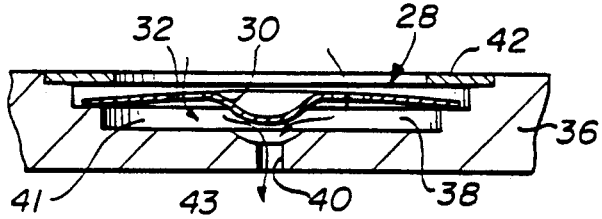
FIG. 6 is a diagrammatic representation of the relief valve of FIG. 5 in which the snap disc has snapped to the opposite bowed position to uncover the orifice and vent the pressure in the chamber.

When the temperature in the pressurized chamber 14 rises to a predetermined amount, the snap disc 28 moves to its second bowed position as illustrated in FIG. 6. A retainer ring 42 prevents the snap disc 28 from escaping from the recess 41 during the transition from the first to this second bowed position. In that position, the arcuate convex surface 30 of the snap disc 28 has moved away from the arcuate valve seat 43 of the orifice 40 thus allowing pressure in the chamber to escape through the orifices 32 and through the vent orifice 40 thus depressurizing chamber 14.

Figure 7:
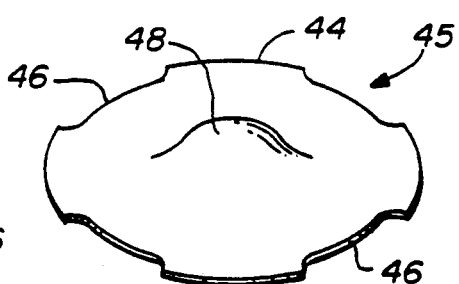
FIG. 7 is an isometric view of an alternate embodiment of the snap disc which has a plurality of recesses on the periphery thereof forming a scalloped edge for the purpose of allowing pressure in the enclosed chamber to be vented through the recesses and the vent orifice when the snap disc is snapped to the opposite bowed position as illustrated in FIG. 6.

An alternate version of the snap disc is shown as disc 45 in FIG. 7. In this embodiment, a plurality of recesses 46 are formed in the periphery 44 of the snap disc 45 and when it is mounted as illustrated in FIG. 5, the arcuate convex surface 48 mates with the arcuate valve seat 43 and seals the vent orifice 40. When the appropriate temperature is reached and the snap disc 45 snaps to the opposite bowed position such as that illustrated in FIG. 6, the pressure in chamber 14 passes through the recesses 46 in the periphery of disc 45 into the vent orifice 40 and reduces the pressure or relieves the pressure in chamber 14.

Figure 8:
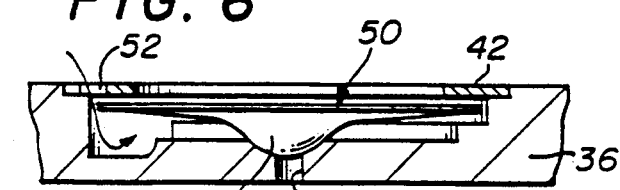
FIG. 8 is a diagrammatic representation of another embodiment of the present invention in which an opening is formed in the chamber under the periphery of the snap disc to allow pressure in the enclosed chamber to be vented through the opening and the vent orifice when the snap disc is in the opposite bowed position.

Another embodiment is illustrated in FIG. 8 in which the snap disc 50 is shaped like that in FIG. 2 but has no orifices 32 in it. Instead, an opening 52 is formed in wall 36 under a portion of the periphery of the snap disc 50 to allow pressure in the enclosed chamber 14 to be vented through the opening 52 and the vent orifice 40 when the snap disc 50 snaps to the second bowable position such as that illustrated in FIG. 6.

Figure 9:
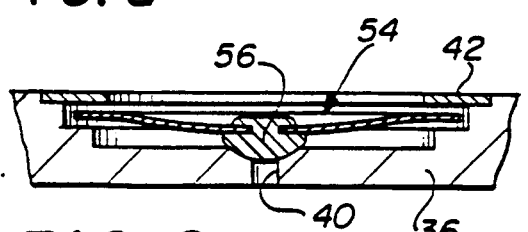
FIG. 9 is a diagrammatic representation of yet another embodiment of the present invention in which the arcuate convex surface which seals the vent orifice is an insert on the snap disc such as a rivet-like structure or a polymeric structure with a convex head that seals the vent orifice.

Another alternate embodiment is illustrated in FIG. 9. In this case, the snap disc 54 has an insert 56 therein which seals the orifice 40. The insert may be a rivet-like structure whose arcuate shaped head matches the arcuate valve seat 43 and seals orifice 40. The insert 56 may also be formed of a polymeric structure with a convex head that seals the vent orifice 40. In this embodiment, orifices may be formed in the disc 54 similar to that shown in FIG. 2, recesses may be formed in the periphery as shown on FIG. 7 or an opening may be formed in the wall under the edge of the disc as that shown in FIG. 8.

Figure 10:
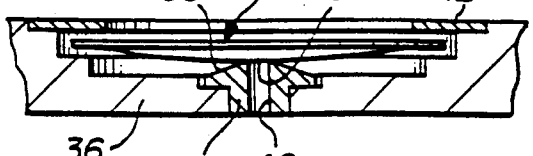
FIG. 10 is a diagrammatic representation of still another embodiment of the present invention in which the vent orifice includes a polymeric valve seat in the shape of truncated cone with the snap disc being saucer shaped and having a substantially flat surface matching the truncated cone surface to completely seal the vent orifice in the first bowed position of the snap disc.

In the embodiment illustrated in FIG. 10, the vent orifice 40 is formed in a polymeric valve seat 58 which has an upper portion 60 in the shape of a truncated cone. The snap disc 62 has the same saucer shape as in FIG. 2 without the arcuate convex surface 30. Instead, it has a substantially flat surface 64 which seals against the truncated cone surface of the upper portion 60 to completely seal the vent orifice in the first bowed position of the snap disc 62. When the snap disc 62 snaps to the second bowed position upon the proper temperature being reached, the orifice 40 is uncovered and the pressure in the chamber is vented through either orifices 32 formed in the surface of snap disc 62, recesses 46 formed in the outer edge of the snap disc 62 or an opening 52 in the wall 36 under the outer peripheral edge of snap disc 62 all as previously described.

In the embodiments just described, as stated, the snap disc in each case is mounted in the chamber with respect to the vent orifice such that gravity orients the snap disc in sealing relationship with the vent orifice in the first bowed position. If it is desired to provide a positive seating force on the snap disc or in installations where the snap disc has to be spatially oriented in the chamber such that gravity cannot cause it to be oriented in sealing relationship with the orifice in the first bowed position, a biasing mechanism may be associated with the snap disc to forcibly orient the snap disc in sealing relationship with the venting orifice in the first bowed position of the snap disc regardless of the spatial orientation of the snap disc and the chamber.

Figure 11A:
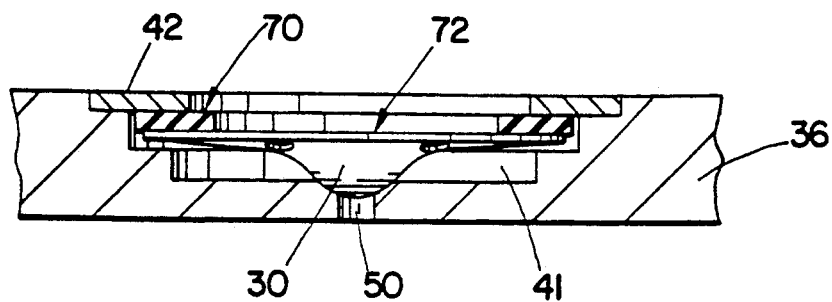
FIG. 11A is a diagrammatic representation of another embodiment of the present invention that uses a foam washer as a biasing mechanism for the snap disc to forcibly orient snap disc in sealing relationship with the venting orifice in the first bowed position of the snap disc regardless of the spatial orientation of the snap disc and the chamber.
Figure 11B:
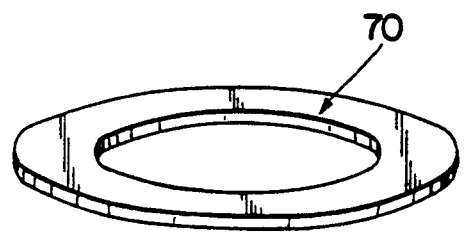
FIG. 11B is an isometric view of the foam washer used as the biasing mechanism in FIG. 11A.

FIG. 11A discloses one embodiment of such a biasing mechanism in which a resilient foam washer 70 is placed between snap ring 42 and the upper surface 72 of the snap disc 30. Snap disc 30 reverts from its first bowed position as shown to its first bowed position upon a change in temperature as described previously. When it reverts to its first bowed position, the resilient foam washer applies a positive pressure to the upper surface 72 of the snap disc 30 thus causing it to be forcibly oriented in sealing relationship with the orifice 40 in the first bowed position regardless of the spatial orientation of the snap disc 30 and the chamber 41 FIG. 11B is an isometric view of the resilient foam washer 70 which may be of any well-known type in the prior art. The only requirement of the resilient foam washer is that it have sufficient resiliency to provide a positive pressure to the upper surface 72 of the snap disc 30 to cause forceable seating of the snap disc 30 on the vent orifice 40 when the snap disc 30 reverts to its first bowed position.

Figure 12A:
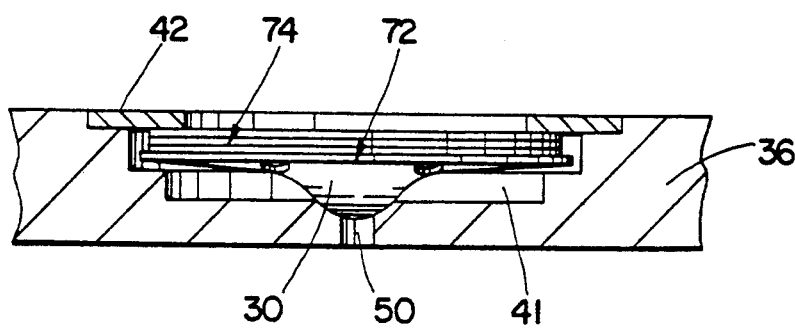
FIG. 12A is a diagrammatic representation of another embodiment of the present invention in which a coil spring is used as the biasing mechanism associated with the snap disc to forcibly orient the snap disc in sealing relationship with the orifice in the first bowed position of the snap disc regardless of the spatial orientation of the snap disc and the chamber.
Figure 12B:
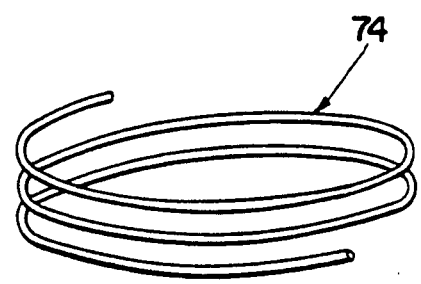
FIG. 12B is an isometric view of the coil spring used in FIG. 12A.

FIG. 12A illustrates a second embodiment of a biasing mechanism associated with the snap disc to forcibly orient the snap disc in sealing relationship with the sealing orifice in the first bowed position regardless of the spatial orientation of the snap disc and the chamber As can be seen in FIG. 12A, a coil spring 74 is mounted between the chamber 36 and the snap disc 30 such that when the snap disc 30 reverts to the first bowed position from the second bowed position, the coil spring 74 forces the snap disc 30 into sealing relationship with the vent orifice 40. FIG. 12B is an isometric view of the coil spring 74 used as the biasing mechanism in FIG. 12A.

Figure 13A:
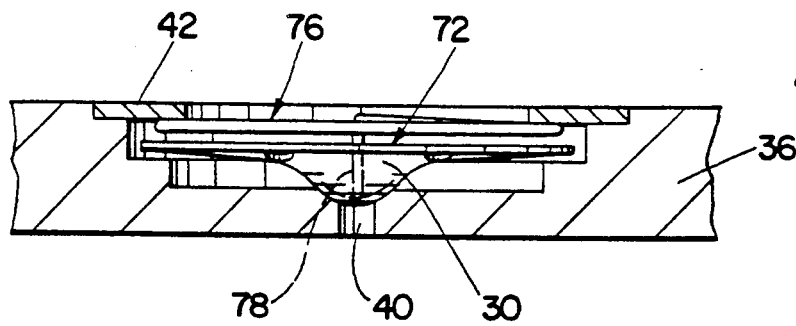
FIG. 13A is a diagrammatic representation of still another embodiment of the present invention in which the vent orifice has a concave surface and the snap disc has a mating concave surface such that the mating surfaces seal the orifice in the first bowed position and illustrate the biasing mechanism as a spring with an axial extension mounted between the chamber and the snap disc with the axial extension engaging the concave surface of the disc such that when the snap disc reverts to the first bowed position from the second bowed position, the spring with axial extension forces the snap disc into sealing relationship with the orifice regardless of the spatial orientation of the snap disc and the chamber.
Figure 13B:
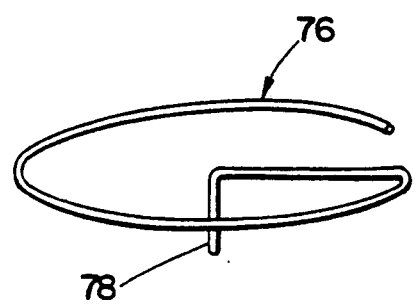
FIG. 13B is an isometric view of the spring with axial extension that it utilized in FIG. 13A as the biasing mechanism.

FIG. 13A is still another diagrammatic representation of a biasing mechanism associated with the snap disc to forcibly orient the snap disc in sealing relationship with vent orifice in the first bowed position of the snap disc regardless of the spatial orientation of the snap disc and the chamber. As can be seen in FIG. 13A, the vent orifice 40 can be seen to have a concave surface such as described previously and the snap disc 30 has a mating concave surface such that the mating surfaces seal the vent orifice in the first bowed position. A spring 76 with an axial extension 78 is mounted between the chamber and the snap disc 30 with the axial extension 78 engaging the inner side of the concave surface of the disc 30 such that when the snap disc 30 reverts to the first bowed position from the second position, the spring 76 with axial extension 78 forces the snap disc 30 into sealing relationship with the vent orifice regardless of the spatial orientation of the snap disc 30 and the chamber 41. FIG. 13B is an isometric view of the spring 76 with axial extension 78 used as the biasing mechanism in FIG. 13A.

Thus, there has been disclosed a simple device to protect compressors from over temperature conditions due to a variety of causes. The invention provides for lower component costs and easy assembly as compared to the prior art Further the use of a simple bypass valve puts less stress on the motor because the motor does not have to constantly start and stop until a blocked heat exchanger or other problem is corrected. Also, the bypass valve yields fast system recovery when the problem is cleared. Further, the pressure drop across the valve assists the vent orifice to be completely sealed In those installations where the snap disc has a spatial orientation on the bypass valve such that gravity cannot seat the snap disc on the vent orifice, a biasing mechanism is provided between the snap disc and the chamber in which it is mounted to force the snap disc into sealing relationship with the vent orifice regardless of the spatial orientation of the snap disc in the bypass valve.

While the invention has been shown and described with respect to particular embodiments thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

We claim:

1. In a normally closed thermostatic pressure relief valve including a vent orifice and a bimetallic disc for selectively opening and closing said vent orifice, said vent orifice having an arcuate concave valve seat coincidental therewith, said bimetallic disc having an unclamped periphery and an arcuate convex central surface formed integrally therein for cooperation with said valve seat to block fluid flow through said vent orifice, and said bimetallic disc being snappable to an open position responsive to an elevated temperature condition for displacing said arcuate convex central surface on said disc from said arcuate concave valve seat to allow fluid flow through said vent orifice.

2. The valve of claim 1 wherein said vent orifice is centrally located in a stepped recess that provides a shoulder engageable by the periphery of said disc in said open position thereof, and a retainer in said recess on the opposite side of said disc from said vent orifice for retaining said disc in said recess.

3. The valve of claim 1 wherein said vent orifice is in a wall separating a compressor chamber from a plenum chamber and said valve in said open position of said disc provides recirculation of fluid form said plenum chamber to said compressor chamber.

4. The valve of claim 1 including passages for allowing fluid flow past said disc to said vent orifice in said open position of said disc.

5. The valve of claim 4 wherein said passages are in said disc.

6. The valve of claim 1 wherein said vent orifice is in a recess receiving said disc, a retainer ring in said recess on the opposite side thereof from said vent orifice for preventing displacement of said disc from said recess, and biasing means between said retainer ring and said disc for biasing said disc in a direction for engaging said arcuate convex surface on said disc with said arcuate concave valve seat.

7. The valve of claim 6 wherein said biasing means comprises an elastomeric ring engaging said retainer ring and a peripheral portion of said disc.

8. The valve of claim 6 wherein said biasing means comprises a coil spring engaging said retainer ring and a peripheral portion of said disc.

9. The valve of claim 6 wherein said biasing means comprise a coil spring engaging said retainer ring adjacent a peripheral portion of said disc and engaging said disc within the concave recess formed by said central arcuate convex surface.

* * * * *